3,419,583
2α-FLUORO-DERIVATIVES OF THE
ANDROSTANE SERIES
John Edwards and Howard J. Ringold, Mexico City,
Mexico, assignors, by mesne assignments, to Syntex Corporation, a corporation of Panama
No Drawing. Filed Apr. 6, 1960, Ser. No. 20,239
Claims priority, application Mexico, June 1, 1959,
54,718
19 Claims. (Cl. 260—397.4)

The present invention relates to cyclopentanophenanthrene compounds and to a novel process for the production thereof.

More particularly the invention relates to novel 2α-fluoro steroid compounds of the androstane series.

The novel compounds of the present invention are valuable hormones which exhibit anti-estrogenic, anti-androgenic and anti-gonadotrophic activity. The 2α-fluoro compounds unsubstituted at C–17α or substituted with an alkyl or alkenyl group at C–17α also possess a favorable anabolic-androgenic ratio in addition to the anti-estrogenic, anti-androgenic and anti-gonadotrophic activities.

The novel compounds of the present invention may be characterized by the following formulae:

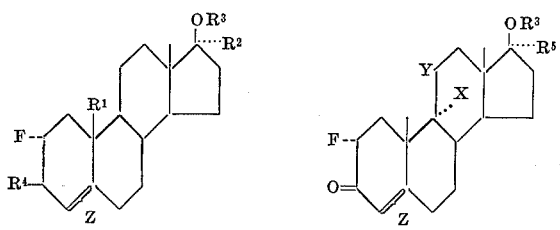

In the above formulae, $R^1$ represents hydrogen or methyl. $R^2$ represents hydrogen or an aliphatic hydrocarbon radical containing from 1 to 8 carbon atoms and which may be saturated or unsaturated with one or more double or triple bonds, either isolated or in conjugation. Typical aliphatic hydrocarbon groups are methyl, ethyl, propyl, butyl, vinyl, propen(1)yl, buten(1)yl, ethinyl propin(1)yl, butadienyl and the like. $R^3$ represents hydrogen or an acyl group. $R^4$ represents keto, β-hydroxy, α-hydroxy or a β-acyloxy group. $R^5$ represents hydrogen or an alkyl radical which contains from 1 to 8 carbon atoms. Y represents keto or β-hydroxy; X represents hydrogen or fluorine, and Z indicates a double bond between C–4 and C–5 or a saturated linkage between C–4 and C–5. When Z represents a saturated bond between C–4 and C–5, Rings A and B are in trans position.

The acyl groups may be derived from monocarboxylic or polycarboxylic acids containing from 1 to 12 carbon atoms and may be saturated or unsaturated, straight chain or branched chain, aliphatic, cyclic or mixed cyclic aliphatic and may be substituted as by hydroxy, acyloxy, containing from 1 to 12 carbon atoms, alkoxy containing from 1 to 5 carbon atoms, amino or halogen such as bromine, chlorine or fluorine. The acyl groups may also be derived from sulfonic or sulfuric acids. Typical ester groups are the acetate, propionate, butyrate, hemisuccinate, enanthate, caproate, benzoate, aminoacetate, trimethylacetate, phenoxyacetate, sulfate, cyclopentylpropionate and β-chloropropionate. Water soluble salt derivatives such as the alkali metal salts of the hemisuccinates, the disodium salt of esters formed with phosphoric acid or the hydrohalides of esters formed with aminoacids, particularly the aminoacetate, are also included in the present invention.

The preparation of the novel 2-fluoro steroids of the androstane series which form the subject matter of the present invention may be illustrated in part by the following equation insofar as Rings A and B are concerned:

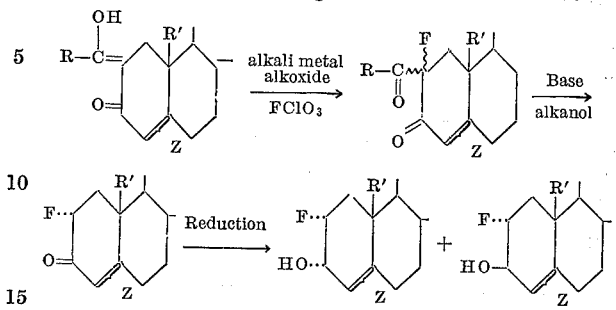

In the above equation, $R^1$ and Z have the same meaning as previously set forth. R represents hydrogen or a carboalkoxy group, preferably carbomethoxy or carboethoxy.

The wavy line at C–2 indicates α or β steric configuration for the substituents thereat.

In practicing the process outlined above, a molar equivalent or more of an alkali metal alkoxide such as sodium methoxide is added to a solution of a 2-hydroxymethylene or a 2-alkoxyoxalyl derivative of a testosterone or of a dihydroallotestosterone in an inert solvent such as benzene or methanol thus forming the sodium salt thereof. A stream of perchloryl fluoride is then introduced into the mixture with continuous stirring until the mixture is neutral, thus forming the 2-fluoro-2-aldehydo or 2-fluoro-2-alkoxyoxalyl derivatives of a testosterone or of a dihydroallotestosterone. By subsequent treatment of the latter with a base such as sodium methoxide or potassium acetate in methanol solution, there is obtained the 2α-fluoro derivative of a testosterone or of a dihydroallotestosterone.

The 3-keto group may then be reduced to the hydroxyl group by treatment in a solvent, such as tetrahydrofuran, with a double metal hydride such as sodium borohydride dissolved in water; the reduction yields a mixture of the 3β and 3α hydroxyl compounds with the 3β compound predominating; the isomers are then separated by chromatography.

The hydroxyl groups of the novel 2α-fluoroandrostanes are esterified by conventional methods. The secondary hydroxyl groups at C–3 and/or at C–17β of the compounds unsubstituted at C–17α are reacted with the respective carboxylic acid anhydride in pyridine; the tertiary hydroxyl group at C–17β of the compounds substituted at C–17α is preferably esterified by reaction with the respective carboxylic acid anhydride in benzene solution and in the presence of p-toluenesulfonic acid.

The novel process of this invention is suitable for steroids of the androstane series which may also have oxygenation at C–11 and/or a halogen substituent such as fluorine at C–9α, an aliphatic hydrocarbon side chain at C–17α, as well being suitable for androstanes of 19-nor series.

The starting 2-hydroxymethylene or 2-alkoxyoxalyl compounds are prepared by treating a dihydroallotestosterone or a testosterone with an ester such as an alkyl formate or an alkyl oxalate in the presence of an alkali metal alkoxide, for example, sodium methoxide, or an alkali metal hydride such as sodium hydride, in an inert solvent, for example benzene or dioxane, followed by acidification with dilute hydrochloric acid to yield a 2-hydroxymethylene or a 2-alkoxyoxalyl-dihydroallotestosterone or testosterone.

The following examples serve to illustrate but are not intended to limit the present invention:

EXAMPLE I

A solution of 2 g. of 2-hydroxymethylene-dihydroallotestosterone described by H. J. Ringold et al. in J. Am. Chem. Soc. 81, 427 (1959), in 200 cc. of benzene was treated with 1.1 molar equivalents of sodium methoxide dissolved in 40 cc. of methanol; the sodium salt precipitated immediately. A stream of perchloryl fluoride was then introduced into the mixture with continuous stirring and at room temperature for 1 hour, at the end of which the mixture showed a neutral reaction. It was then washed with water, dried over anhydrous sodium sulfate and the benzene was evaporated to obtain an oily residue which was dissolved in 100 cc. of methanol. 4 g. of potassium acetate was added and the mixture was refluxed for 8 hours; after concentrating to a small volume under reduced pressure and diluting with water, the product was extracted with methylene chloride; the extract was washed with water, dried over anhydrous sodium sulfate, the solvent was evaporated and the residue purified by chromatography on neutral alumina. Recrystallization from acetone-hexane of the solid eluates afforded 2α-fluoro-dihydroallotestosterone; M.P. 182–184° C., $[\alpha]_D + 63$ (chloroform).

Acetylation of the latter compound with acetic anhydride in pyridine in a conventional manner afforded the acetate of 2α-fluoro-dihydroallotestosterone.

EXAMPLE II

To a solution of 2 g. of 2-hydroxymethylene-17α-methyl-dihydroallotestosterone described by H. J. Ringold et al. in J. Am. Chem. Soc. 81, 427 (1959), in 80 cc. of dry benzene was added 40 cc. of methanol containing 0.34 g. of sodium methoxide, whereupon the sodium salt precipitated immediately; a stream of perchloryl fluoride was then introduced into the mixture for 20 minutes, with vigorous stirring at room temperature; at the end of this time the mixture showed a neutral reaction. It was then treated with potassium acetate, described in Example I, to produce 17α-methyl-2α-fluoro-dihydroallotestosterone; M.P. 193–196° C., $[\alpha]_D + 46°$ (chloroform). By subsequent reaction with 2 g. of acetic anhydride and 500 mg. of p-toluenesulfonic acid in 50 cc. of benzene, overnight at room temperature, there was obtained the acetate of 17α-methyl-2α-fluoro-dihydroallotestosterone.

EXAMPLE III

By following the method described in Example II, 1 g. of 2-ethoxyoxalyl-17α-vinyl-dihydroallotestosterone was converted into its sodium salt which was treated with a stream of perchloryl fluoride for 2 hours. The reaction mixture was then treated with potassium acetate, as described in Example I, to produce 17α-vinyl-2α-fluoro-dihydroallotestosterone.

Subsequent treatment with 1 cc. of caproic anhydride and 250 mg. of p-toluenesulfonic acid in 25 cc. of benzene, overnight at room temperature, produced the caproate of 2α-fluoro-17α-vinyl-dihydroallotestosterone.

The starting material, namely 2-ethoxyoxalyl-17α-vinyl-dihydroallotestosterone was obtained from 17α-vinyl-dihydroallotestosterone by condensation with ethyloxalate in benzene solution and in the presence of sodium hydride in accordance with the method of H. J. Ringold et al. in J. Am. Chem. Soc. 81, 427 (1959).

EXAMPLE IV

In accordance with the method described by H. J. droxymethylene - 17α - methyl - 19 - nor-androstan-17β-ethinyl-dihydroallotestosterone was condensed with ethyl formate and thus converted into the corresponding 2-hydroxymethylene derivative, which in turn, by following the method of Example I, gave 2α-fluoro-17α-ethinyl-dihydroallotestosterone. Esterification of the above compound by applying the method of Example 2 afforded the corresponding acetate.

EXAMPLE V

In accordance with the method of Example I, 2-hydroxymethylene - 17α - methyl - 19 - nor-androstan-17α-ol-3-one described by H. J. Ringold et al. in J. Am. Chem. Soc. 81, 427 (1959), was converted into 2α-fluoro-17α-methyl-19-nor-dihydroallotestosterone. Treatment of the above compound with caproic anhydride by applying the method of Example III, gave the caproate of 2α-fluoro-17α-methyl-19-nor-dihydroallotestosterone.

EXAMPLE VI

In accordance with the method described by H. J. Ringold et al. in J. Am. Chem. Soc. 81, 427 (1959), 2 g. of 19-nor-dihydroallotestosterone were converted into the 2-ethoxyoxalyl derivative, which in turn, by following the method of Example I, gave 2α-fluoro-19-nor-dihydroallotestosterone.

A mixture of 1 g. of the above compound, 4 cc. of pyridine and 4 cc. of benzoyl chloride was heated on the steam bath for 4 hours. The reaction mixture was then poured into ice water, the precipitate was collected, dried and recrystallized from acetone-ether, there was thus obtained the benzoate of 2α-fluoro-19-nor-dihydroallotestosterone.

EXAMPLE VII

A mixture of 1 g. of 2α-fluoro-dihydroallotestosterone obtained as described in Example I, 4 cc. of pyridine and 4 cc. of propionic anhydride was allowed to stand at room temperature overnight; it was then poured into ice water, the formed precipitate was filtered, washed well with water, dried and recrystallized from methylene chloride ether, thus yielding the propionate of 2α-fluoro-dihydroallotestosterone.

EXAMPLE VIII

By following the method described in Example I, 2 g. of 2-ethoxyoxalyl-testosterone described by H. J. Ringold et al. in J. Am. Chem. Soc. 81, 427 (1959), was converted into its sodium salt which was treated with perchloryl fluoride for 2 hours; the reaction product was isolated and refluxed with potassium acetate in methanol for 24 hours to produce finally 2α-fluoro-testosterone.

Acetylation of the above compound in a conventional manner gave the acetate of 2α-fluoro-testosterone.

EXAMPLE IX

In accordance with the method of Example I, 2-hydroxymethylene - 17α - methyl-testosterone described by H. J. Ringold et al. in J. Am. Chem. Soc. 81, 427 (1959), was converted into its sodium salt and then treated with perchloryl fluoride; subsequent treatment with base gave 2α-fluoro-17α-methyl-testosterone.

A mixture of 5 g. of the above compound, 250 cc. of acetic acid, 25 cc. of acetic anhydride and 5 g. of p-toluenesulfonic acid was kept overnight at room temperature, then most of the liquid was evaporated by distillation under reduced pressure in a bath at a temperature below 40° C., the residue was diluted with water and the precipitate was collected and recrystallized from acetone-hexane, thus giving the acetate of 17α-methyl-2α-fluoro-testosterone.

EXAMPLE X

By following the method described in Example I, 2 g. of 2-hydroxymethylene-17α-ethinyl-testosterone, obtained from 17α-ethinyl-testosterone in accordance with the method of H. J. Ringold et al. in J. Am. Chem. Soc. 79, 427 (1959), was converted into 17α-ethinyl-2α-fluoro-testosterone. A solution of 5 g. of the latter compound in 200 cc. of dry benzene was treated with 6 cc. of propionic anhydride and 500 mg. of p-toluenesulfonic acid, kept at 25° C. for 24 hours, cooled, diluted with water and the benzene layer was separated, washed with 5% aqueous sodium carbonate solution and then with water, the benzene was evaporated and the residue recrystallized from acetone-hexane, thus affording the propionate of 17α-ethinyl-2α-fluoro-testosterone.

EXAMPLE XI

By following the method of Example I, 2.5 g. of 2-ethoxyoxalyl-17α-vinyl-testosterone, obtained from 17α-vinyl-testosterone in accordance with the method of H. J. Ringold et al. in J. Am. Chem. Soc. 79, 427 (1959), was converted into its sodium salt which was treated with perchloryl fluoride for 2 hours. The reaction product was isolated and refluxed with potassium acetate in methanol for 24 hours to produce finally 2α-fluoro-17α-vinyl-testosterone.

EXAMPLE XII

By following the method of Example I, 2 g. of the 2-hydroxymethylene derivative of 19-nor-testosterone was converted into 2α-fluoro-19-nor-testosterone. Treatment of the latter compound with propionic anhydride in pyridine, in accordance with the method of Example VII, gave the propionate of 2α-fluoro-19-nor-testosterone.

EXAMPLE XIII

Example IX was repeated but using 2-hydroxymethylene-17α-methyl-19-nor-testosterone as starting material. There were thus obtained 2α-fluoro-17α-methyl-19-nor-testosterone and its corresponding acetate.

EXAMPLE XIV

In accordance with the method of Example I, 2 g. of 2-ethoxyoxalyl-17α-ethynyl-19-nor-testosterone, obtained from 17α-ethynyl-19-nor-testosterone by following the method described by Ringold et al. in J. Am. Chem. Soc. 81, 427, (1959) was converted into 2α-fluoro-17α-ethinyl-19-nor-testosterone.

By following the esterification method of Example X, but using cyclopentylpropionic anhydride as acylating agent, there was obtained the cyclopentylpropionate of 2α-fluoro-17α-ethinyl-19-nor-testosterone.

EXAMPLE XV

A mixture of 2 g. of 2α-fluoro-testosterone, 8 cc. of pyridine and 4 cc. of benzoyl chloride was heated on the steam bath for 4 hours. The reaction mixture was then poured into ice-water, the precipitate was collected, dried and recrystallized from methylene chloride-ether, thus yielding the benzoate of 2α-fluoro-testosterone.

EXAMPLE XVI

A solution of 1 g. of 2α-fluoro-androstan-17β-ol-3-one in 50 cc. of tetrahydrofuran was mixed with a solution of 200 mg. of sodium borohydride in 5 cc. of water and the mixture was kept at room temperature for 16 hours. The excess of hydride was then decomposed by the addition of 0.5 cc. of acetic acid. It was then poured into ice cold sodium chloride solution and the formed precipitate filtered, dried and chromatographed on neutral alumina, thus producing the 3α- and 3β-isomers of 2α-fluoro-androstane-3,17β-diol, where the 3β-isomer predominated.

A mixture of 500 mg. of 2α-fluoro-androstane-3β,17β-diol, 2 cc. of pyridine and 2 cc. of acetic anhydride was kept at room temperature overnight. The reaction mixture was poured into ice-water, the precipitate was collected and recrystallized from acetone-hexane, thus producing 2α-fluoro-androstane-3β,17β-diol diacetate.

In accordance with the method described in the previous example, the compounds listed below under I were converted into the corresponding 3-alcohols (mixture of 3α- and 3β-isomers) listed under II.

| Example | I | II |
|---|---|---|
| XVII | 2α-fluoro-17α-methyl-dihydroallotestosterone. | 2α-fluoro-17α-methyl-androstane-3,17β-diol. |
| XVIII | 2α-fluoro-17α-vinyl-dihydroallotestosterone. | 2α-fluoro-17α-vinyl-androstane-3,17β-diol. |
| XIX | 2α-fluoro-17α-ethinyl-dihydroallotestosterone. | 2α-fluoro-17α-ethinyl-androstane-3,17β-diol. |
| XX | 2α-fluoro-17α-methyl-19-nor-dihydroallotestosterone. | 2α-fluoro-17α-methyl-19-nor-androstane-3,17β-diol. |
| XXI | 2α-fluoro-testosterone | 2α-fluoro-Δ⁴-androstene-3,17β-diol. |
| XXII | 2α-fluoro-17α-methyl-testosterone. | 2α-fluoro-17α-methyl-Δ⁴-androstene-3,17β-diol. |
| XXIII | 2α-fluoro-17α-vinyl-testosterone. | 2α-fluoro-17α-vinyl-Δ⁴-androststene-3,17β-diol. |
| XXIV | 2α-fluoro-17α-ethinyl-testosterone. | 2α-fluoro-17α-ethinyl-Δ⁴-androstene-3,17β-diol. |
| XXV | 2α-fluoro-17α-methyl-19-nor-testosterone. | 2α-fluoro-17α-methyl-19-nor-Δ⁴-androstene-3,17β-diol. |

EXAMPLE XXVI

In accordance with the method of Example IX, 2α-fluoro-17α-methyl-19-nor-Δ⁴-androstene-3β,17β-diol and 2α-fluoro-17α-methyl-19-nor-androstane-3β,17β-diol were converted into the corresponding 3,17-diacetates.

EXAMPLE XXVII 1 g. of 2α-fluoro-17α-ethinyl-androstane-3β,17β-diol, isolated by chromatography of the mixture of isomers obtained in Example XIX was treated with propionic anhydride in pyridine solution, as described in Example VII, to produce 2α-fluoro-17α-ethinyl-androstane-3β,17β-diol 3-propionate.

By subsequent reaction with acetic anhydride in mixture with acetic acid and p-toluenesulfonic acid, in accordance with the method of Example IX, there was obtained 2α-fluoro-17α-ethinyl-androstane-3β,17β-diol 3-propionate 17-acetate.

EXAMPLE XXVIII

By following the esterification method of Example VII but using cyclopentylpropionic anhydride instead of acetic anhydride, 2α-fluoro-Δ⁴-androstene-3β,17β-diol, isolated by chromatography of the mixture of isomers obtained in Example XXI, was converted into 2α-fluoro-Δ⁴-androstene-3β,17β-diol-biscyclopentylpropionate, when the propionic anhydride was used as esterifying agent, the dipropionate of 2α-fluoro-Δ⁴-androstene-3β,17β-diol was obtained.

EXAMPLE XXIX

Example XXVII was repeated but using 2α-fluoro-17α-methyl-19-nor-Δ⁴-androstene-3β,17β-diol as starting material. There was thus obtained a 2α-fluoro-17α-methyl-Δ⁴-androstene-3β,17β-diol 3-propionate and 2α-fluoro-17α-methyl - Δ⁴-androstene-3β,17β-diol 3-propionate 17-acetate.

EXAMPLE XXX

A solution of 2 g. of 2-hydroxymethylene-17α-methyl-11β-hydroxy-testosterone described in our copending patent application Ser. No. 704,899, filed Dec. 4, 1957, in 300 cc. of benzene was treated with 1.1 molar equivalents of sodium methoxide dissolved in 40 cc. of methanol; the sodium salt precipitated immediately. A stream of perchloryl fluoride was then introduced into the mixture with continuous stirring and at room temperature for 2 hours. It was then washed with water, dried over anhydrous sodium sulfate and the benzene was evaporated to obtain an oil residue which was dissolved in 100 cc. of methanol, 4 g. of potassium acetate was added and the mixture was refluxed for 8 hours; after concentrating to a small volume under reduced pressure and diluting wtih water, the product was extracted with methylene chloride; the extract was washed with water, dried over anhydrous sodium sulfate, the solvent was evaporated and the residue purified by chromatography on neutral alumina. Recrystallization from acetone-hexane of the solid eluates afforded a 2α-fluoro-17α-methyl-11β-hydroxy testosterone.

EXAMPLE XXXI

In accordance with the method described in the previous example, 2-ethoxyoxalyl-17α-methyl-9α-fluoro-11β-hydroxy-testosterone, obtained from 17α-methyl-9α-fluoro-11β-hydroxy-testosterone by condensation with ethyl oxalate, in accordance with the method described by H. J. Ringold et al. in J. Am. Chem. Soc. 81, 429, (1959), was converted into 17α-methyl-2α,9α-difluoro-11β-hydroxy-testosterone.

EXAMPLE XXXII

By following the method of Example XXX, 2-hydroxymethylene derivatives of 11-keto-testosterone and 11-keto-dihydroallotestosterone described in our copending patent application Ser. No. 704,899 filed on Dec. 4, 1957, were converted respectively into 2α-fluoro-11-keto-testosterone and 2α-fluoro-11-keto-dihydroallotestosterone. Treatment of the first mentioned final compound with cyclopentylpropionic anhydride in pyridine solution gave the cyclopentylpropionate of 2α-fluoro-11-keto-testosterone.

EXAMPLE XXXIII

In accordance with the method described by H. J. Ringold et al. in J. Am. Chem. Soc. 81, 427, (1959), 2 g. of 9α - fluoro - 17β - methyl-11β-hydroxy-dihydroallotestosterone was converted into the corresponding sodium salt of the 2-ethoxyoxalyl derivative, which in turn, by treatment with perchloryl fluoride followed by reflux with potassium acetate gave 2α,9α-difluoro-17α-methyl-11β-hydroxy-dihydroallotestosterone.

A solution of 1 g. of the above compound in 30 cc. of glacial acetic acid was treated dropwise with a solution of 250 mg. of chromium trioxide in 5 cc. of 50% acetic acid, taking care that the temperature remained around 15° C. The reaction mixture was kept at room temperature for 1 hour, poured into ice water and the precipitate was collected, washed with water, dried and recrystallized from acetone-ether, thus affording 2α,9α - difluoro - 17α - methyl - 11 - keto - dihydroallotestosterone.

EXAMPLE XXXIV 5 g. of 9α - fluoro - 11 - keto-17α-methyl-dihydroallotestosterone, described in U.S. Patent 2,813,883 was treated with ethyl formate in accordance with the method described by H. J. Ringold et al. in J. Am. Chem. Soc. 81, 427, (1959), thus producing the 2-hydroxymethylene derivative; upon treatment with perchloryl fluoride followed by reflux with potassium acetate in methanol, as described in Example I, there was obtained 2α-fluoro-17α-methyl-11-keto-dihydroallotestosterone.

EXAMPLE XXXV

In accordance with the method of Example I, 5 g. of 2-hydroxymethylene derivative of 9α-fluoro-11-keto-testosterone obtained from 9α-fluoro-11-keto-testosterone by following the condensation method described by H. J. Ringold et al. in J. Am. Chem. Soc. 81, 427 (1959), was converted into 2α,9α-difluoro-11-keto-testosterone. Acetylation of the latter compound with acetic anhydride in pyridine gave the acetate of 2α,9α-difluoro-11-keto-testosterone.

EXAMPLE XXXVI

In accordance with the method described by H. J. Ringold et al. in J. Am. Chem. Soc. 81, 427, (1959), 2 g. of 17α-ethyl-19-nor-testosterone and 2 g. of 17α-ethyl-19-nor-androstan-17β-ol-3-one were converted into the corresponding 2-hydroxymethylene derivatives, which in turn, by following the procedure of Example I, gave respectively 2α-fluoro-17α-ethyl-19-nor-testosterone and 2α-fluoro-1α-ethyl-19-nor-dihydroallotestosterone.

We claim:
1. A compound of the following formula:

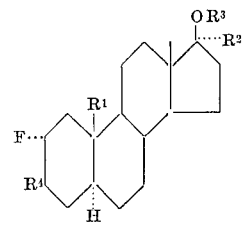

wherein $R^1$ is selected from the group consisting of hydrogen and methyl, $R^2$ is selected from the group consisting of hydrogen and aliphatic hydrocarbon radicals containing from 1 to 8 carbon atoms, $R^3$ is selected from the group consisting of hydrogen and a hydrocarbon carboxylic acyl group containing less than 12 carbon atoms and $R^4$ is selected from the group consisting of β-hydroxy, α-hydroxy and β-acyloxy in which the acyl group is that of a hydrocarbon carboxylic acid of less than 12 carbon atoms.

2. 2α-fluoro-17α-ethinyl-dihydroallotestosterone.
3. 2α-fluoro-androstan-3,17β-diol.
4. 2α-fluoro-17α-ethinyl-androstane-3,17β-diol.
5. 2α-fluoro-17α-methyl-19-nor-androstane-3,17β-diol.
6. A compound of the following formula:

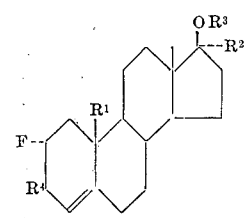

wherein $R^1$ is selected from the group consisting of hydrogen and methyl, $R^2$ is selected from the group consisting of hydrogen and aliphatic hydrocarbon radicals containing from 1 to 8 carbon atoms, $R^3$ is selected from the group consisting of hydrogen and a hydrocarbon carboxylic acyl group containing less than 12 carbon atoms and $R^4$ is selected from the group consisting of β-hydroxy, α-hydroxy and β-acyloxy in which the acyl group is that of a hydrocarbon carboxylic acid of less than 12 carbon atoms.

7. 2α-fluoro-17α-ethinyl-testosterone.
8. 2α-fluoro-19-nor-testosterone.
9. 2α-fluoro-17α-methyl-19-nor-testosterone.
10. 2α-fluoro-17α-ethyl-19-nor-testosterone.
11. 2α-fluoro-17α-ethinyl-19-nor-testosterone.
12. 2α-fluoro-Δ⁴-androstene-3,17β-diol.
13. 2α-fluoro-17α-methyl-Δ⁴-androstene-3,17β-diol.
14. 2α-fluoro-17α-ethinyl-Δ⁴-androstene-3,17β-diol.
15. 2α-fluoro-17α-methyl-19-nor-Δ⁴-androstene-3,17β-diol.
16. A compound of the formula:

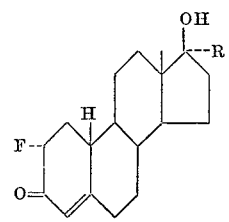

wherein R is selected from the group consisting of hydrogen and methyl.

17. A compound of the following formula:

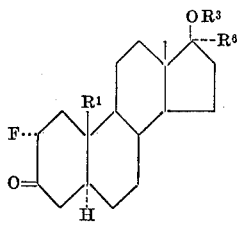

wherein $R^1$ is selected from the group consisting of hydrogen and methyl, $R^3$ is selected from the group consisting of hydrogen and a hydrocarbon carboxylic acyl group containing less than 12 carbon atoms and $R^6$ is an unsaturated aliphatic hydrocarbon radical containing from 2 to 8 carbon atoms.

18. A compound of the following formula:

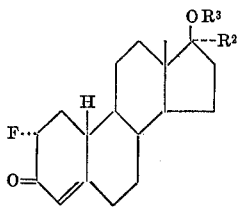

wherein $R^2$ is selected from the group consisting of hydrogen and aliphatic hydrocarbon radicals containing from 1 to 8 carbon atoms and $R^3$ is selected from the group consisting of hydrogen and a hydrocarbon carboxylic acyl group containing less than 12 carbon atoms.

19. A compound of the following formula:

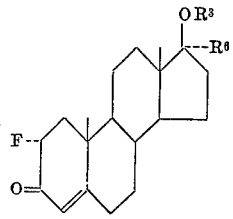

wherein $R^3$ is selected from the group consisting of hydrogen and a hydrocarbon carboxylic acyl group containing less than 12 carbon atoms and $R^6$ is an unsaturated aliphatic hydrocarbon radical containing from 2 to 8 carbon atoms.

No references cited.

ELBERT L. ROBERTS, *Primary Examiner.*

U.S. Cl. X.R.

167—74; 260—397.1, 397.45, 397.5

UNITED STATES PATENT OFFICE
CERTIFICATE OF CORRECTION

Patent No. 3,419,583  Dated December 31, 1968

Inventor(s) JOHN EDWARDS et al.

It is certified that error appears in the above-identified patent and that said Letters Patent are hereby corrected as shown below:

Column 3, line 65, "droxymethylene-17α-methyl-19-nor-androstan-17β-" should read -- Ringold et al. in J. Am. Chem. Soc. $\underline{81}$, 427 (1959), 17α- --. Column 4, line 1, "17α-", second occurrence, should read -- 17β --. Column 7, line 1, "XXI" should read -- XXXI --. Column 7, line 75, "1α" should read -- 17α --.

SIGNED AND
SEALED

MAR 3 - 1970

(SEAL)
Attest:

Edward M. Fletcher, Jr.
Attesting Officer

WILLIAM E. SCHUYLER, JR.
Commissioner of Patents